United States Patent
Weston-Lewis et al.

(10) Patent No.: US 6,170,034 B1
(45) Date of Patent: Jan. 2, 2001

(54) HARDWARE ASSISTED MASK READ/WRITE

(75) Inventors: Graeme Weston-Lewis; David M. Springberg; Stephen D. Hanna, all of Fort Collins, CO (US)

(73) Assignee: LSI Logic Corporation, Milipitas, CA (US)

(*) Notice: Under 35 U.S.C. 154(b), the term of this patent shall be extended for 0 days.

(21) Appl. No.: 09/052,854

(22) Filed: Mar. 31, 1998

(51) Int. Cl.[7] .............................. G06F 12/00; G06F 13/14
(52) U.S. Cl. .................. 711/4; 711/200; 710/24; 710/26; 712/224
(58) Field of Search .................. 710/22, 23, 26, 710/33, 20; 712/5, 224, 300; 711/1, 4, 200, 221

(56) References Cited

U.S. PATENT DOCUMENTS

| | | | |
|---|---|---|---|
| 3,833,887 | * 9/1974 | Shevlin | 358/400 |
| 4,217,638 | * 8/1980 | Namimoto et al. | 711/200 |
| 4,488,256 | 12/1984 | Zolnowsky et al. | 376/900 |
| 4,680,730 | 7/1987 | Omoda et al. | 364/900 |
| 5,126,889 | * 6/1992 | Walden | 714/5 |
| 5,229,999 | * 7/1993 | Cushing et al. | 714/703 |
| 5,369,654 | * 11/1994 | Millis, Jr. | 714/820 |
| 5,422,995 | 6/1995 | Aoki et al. | 395/162 |
| 5,550,989 | 8/1996 | Santos et al. | 395/306 |
| 5,553,307 | * 9/1996 | Fujii et al. | 710/26 |
| 5,596,737 | 1/1997 | Strang et al. | 395/421.03 |
| 5,619,715 | 4/1997 | Dinkjian et al. | 395/800 |
| 5,625,800 | 4/1997 | Brayton et al. | 395/500 |
| 5,687,389 | * 11/1997 | Packer | 710/5 |
| 5,903,769 | * 5/1999 | Arya | 712/5 |
| 5,905,854 | * 5/1999 | Nielson et al. | 714/6 |
| 5,958,029 | * 9/1999 | McKinnon | 710/100 |

OTHER PUBLICATIONS

Hyde, R. "The Art of Assembly Language Programming." 1996. [Online] http://www.comp.it.bton.ac.uk/burks/burks/language/asm/artofasm/artof001.htm.*

* cited by examiner

*Primary Examiner*—Eddie P. Chan
*Assistant Examiner*—Yamir Encarnacion

(57) ABSTRACT

The present invention includes a method of transferring data when some of the data is masked. A mask table is provided to a storage device where it is duplicated and stored with the duplicate. The duplicate data is compared to the original data for a data protection function. A mask index counter and mask bit counter maintain provide values for specific data that are to be processed. The counters are programmable so that if a transfer error occurs, counter values for the next data after the previously transferred good data is calculated and loaded therein. The present invention also has the capability not to transfer the last requested sector if that sector is masked. The present invention evaluates whether a stop count value equals a stop threshold value when a sector is identified as being masked. The stop count value is incremented for each sector that is read from the first storage device, regardless of whether that sector is to be transferred or masked. The stop threshold value is the total number of sectors to be transferred. If the stop count value equals the stop threshold value and the sector is masked (or not), a flag is generated to stop the transfer of that last masked sector.

33 Claims, 4 Drawing Sheets

*1111011*

HARDWARE ASSISTED MASK READ/WRITE

FIELD OF THE INVENTION

The present invention relates to data transfer and more particularly to data transfer of selected data intermixed with other data.

BACKGROUND OF THE INVENTION

There exist some computer applications that use at least two types of data that are stored intermixedly or non-contiguously. For example, audio and video data may be stored in the same file on a hard drive. The file occupies a certain amount of data units, such as sectors, on the storage media of the hard drive. Thus, those sectors contain either audio or video data. Those applications can desire that only one type of data, e.g., video, is transferred.

There exist commands that provide information so that only the desired data type is transferred. This command provides mask information which selects which type of data is to be transferred. Typically, this masked transfer is performed by firmware. Unfortunately, the firmware not only increases system overhead by utilizing microprocessor resources, it also requires precious storage space.

To illustrate, a data controller of a hard drive is coupled to a SCSI bus, a microcontroller, RAM, ROM and the storage medium. The mask information is received by the data controller. Via firmware processing, the microcontroller processes the mask information thereby using valuable microcontroller resources. The firmware must be stored in the ROM, thus using up memory space at an additional cost. Furthermore, present hardware requirements demand faster data transfer between the storage medium and the SCSI bus. The firmware implementation does not readily lend itself to this demand since microcontroller intervention is required, as well as the access time to the ROM to fetch the firmware.

A need exists, therefore, for an implementation that provides a masked data transfer without adding significantly to system overhead. The present invention meets this need.

SUMMARY OF THE INVENTION

The present invention includes a method of transferring data that are not masked. A request is made to provide a masked data transfer. The requester transmits mask information, which is then stored in word-sized sections as a transfer mask table. The mask information is duplicated and also stored in an interleaved manner with the original mask information. Each bit of the mask information is associated to a specific sector address or other data unit address. Each bit of the mask information is compared to its corresponding duplicate bit. An error signal is generated if those bits do not match. The mask table is parsed to effectuate the transfer.

The transfer mask table can be indexed by initializing a mask index counter and a mask bit counter (both counters are programmable). The counters can be considered as storage devices that store, save or maintain values. The mask index counter sets the address of an entry to be first acquired. The mask bit counter sets which bit of the word to first evaluate, i.e., whether certain data is masked. After the first entry is acquired, the mask bit counter starts the next mask word preferably at bit zero. The mask index counter is appended to a mask base address register to form a complete mask buffer address.

After an entire word of sectors is transferred, i.e., each sector that corresponds to a bit of the word is transferred, the next word (if necessary) is fetched. The present invention has nearly all of the time that the last sector of the word is transferred to fetch and load the next word into the mask bit and mask index counters. Thus, the present invention in effect pipelines the mask word fetches to provide continuous data transfer. Furthermore, the counters maintain their respective values so that if the sectors to be transferred are-not contiguous (on the same track), the counters do not have to be reprogrammed at the completion of a track seek.

The present invention also has the capability not to transfer the last requested sector if that sector is masked. This capability eliminates the need to parse the mask table to determine how a data formatter should be programmed. The present invention evaluates whether a stop count value equals a stop threshold value when a sector is identified as being masked. The stop count value is incremented for each sector that is read from the first storage device, regardless of whether that sector is to be transferred or masked. The stop threshold value is the total number of sectors to be transferred and masked. If the stop count value equals the stop threshold value and the sector is masked, a flag is generated to stop the transfer of that last masked sector.

Numerous other advantages and features of the present invention will become readily apparent from the following detailed description of the invention and the embodiments thereof, from the claims and from the accompanying drawings in which details of the invention are fully and completely disclosed as a part of this specification.

DETAILED DESCRIPTION OF THE PREFERRED EMBODIMENT

Figure 1:
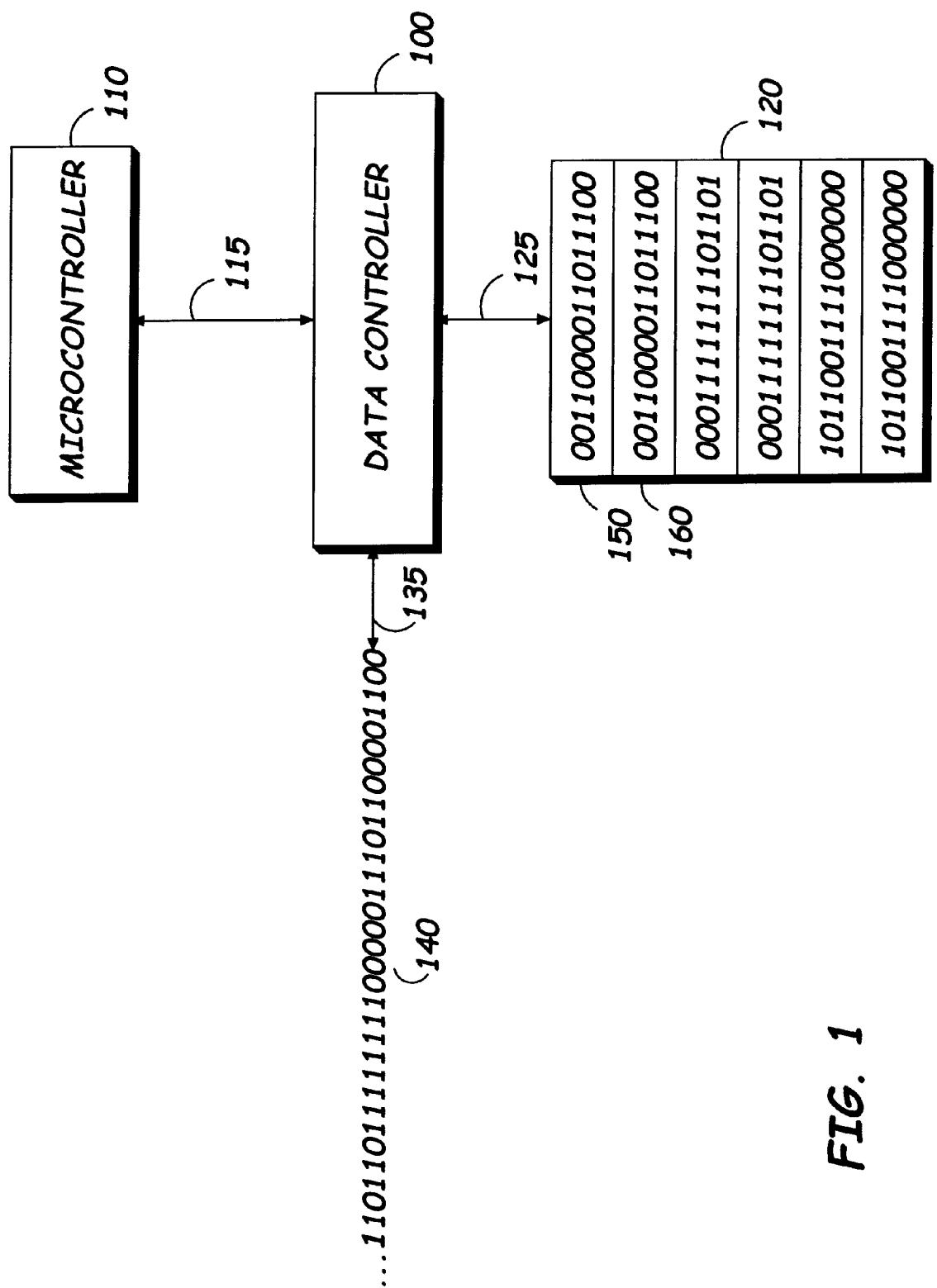
FIG. 1 is a block diagram of components used for data transfer between a storage device and a bus.

While this invention is susceptible of embodiment in many different forms, there is shown in the drawings and will be described herein in detail a specific embodiment thereof with the understanding that the present disclosure is to be considered as an exemplification of the principles of the invention and is not to be limited to the specific embodiment described.

FIG. 1 shows components used for data transfer between a first storage device (not shown) and another device (not shown). A data controller 100 is coupled to the first storage device via a bus 105. The first storage device can be, for example, a hard disk, tape or optical device. Typically, there is an interface electrically coupled between data controller 100 and the first storage device. Data controller 100 is also coupled to a microcontroller 110 via a bus 115, where a microcontroller interface (not shown) can be electrically interposed to data controller 100 and microcontroller 110.

Data controller 100 is further coupled, via a bus 125, to a second storage device 120 that is preferably an EDO DRAM. A bus 135 couples data controller 100 to the other device (not shown) that ultimately transfers data with the first storage device. The other device can be any device that can request a data transfer with the first storage device. Such a device can be a host adapter board or card, a data storage system or any other initiator device that is driving bus 135. Furthermore, bus 135 can transfer data according to different protocols, such as SCSI, ATA, EIDE, EISA, 1394, USB, fibre channel, etc. Buses 105, 115 and 125 are known to one skilled in the art.

Figure 2:
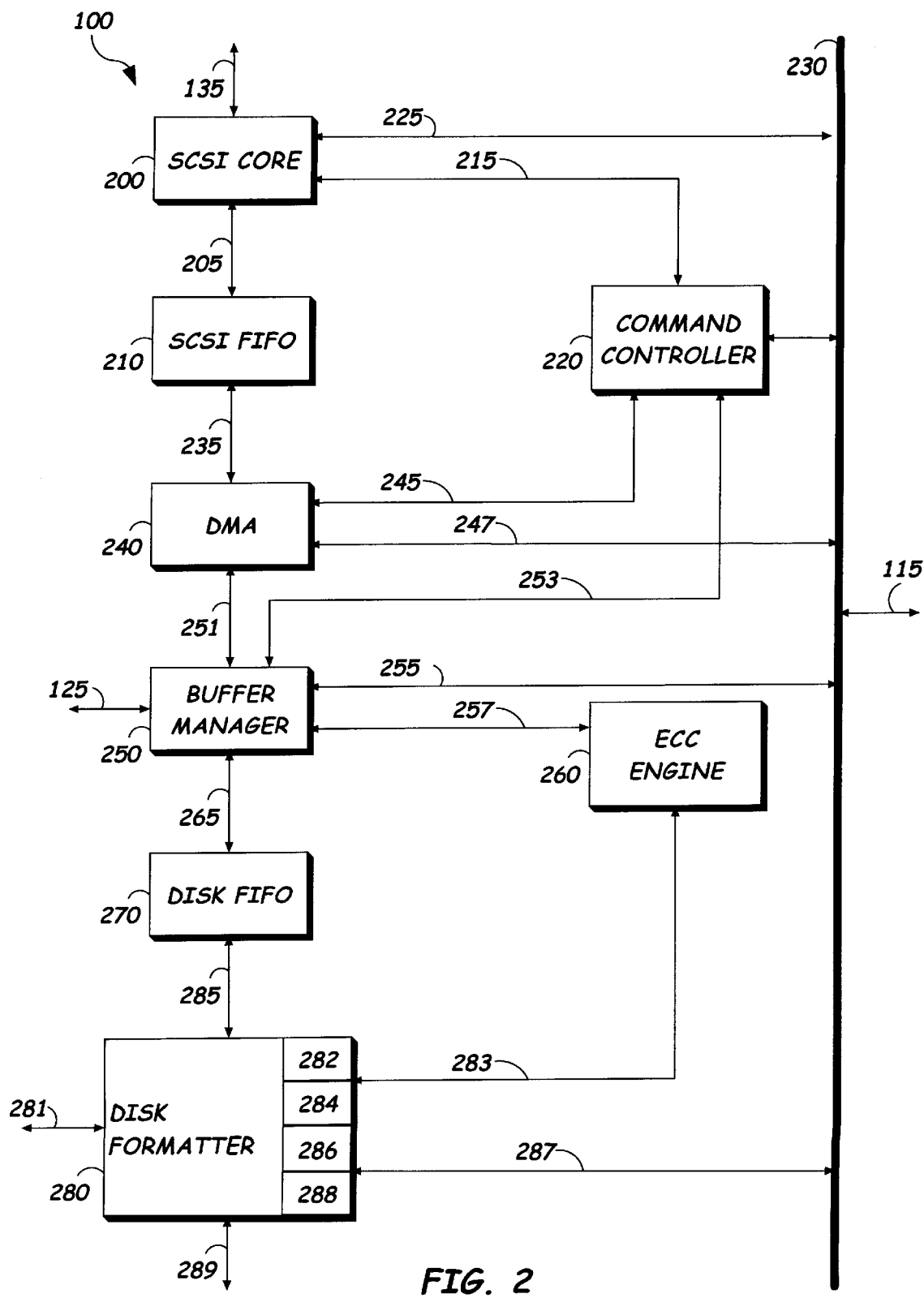
FIG. 2 is a block diagram of the data controller of FIG. 1 that utilizes the present invention.

The configuration of the data controller 100 is illustrated in FIG. 2. Data controller 100 includes a SCSI core 200 connected to bus 135 and is coupled to a SCSI FIFO 210 via a bus 205. SCSI core 200 is also coupled to a main bus 230 via a bus 225 and to a command controller 220 via a bus 215.

SCSI FIFO 210 is coupled to a DMA 240 via a bus 235. DMA 240 is coupled to command controller 220 and main bus 230 via respective buses 245 and 247. DMA 240 is further coupled to a buffer manager 250 via a bus 251. Buffer manager 250 is coupled to command controller 220, main bus 230 and an ECC engine 260 via respective buses 253, 255 and 257. Buffer manager 250 is also coupled to second storage device 120 via bus 125. A buffer interface may be electrically disposed between buffer manager 250 and second storage device 120.

A disk FIFO 270 is coupled to buffer manager 250 and a disk formatter 280 via buses 265, 285, respectively. Disk formatter 280 is coupled to ECC engine 260 via a bus 283 and to main bus 230 via a bus 287. Servo logic (not shown) is coupled to disk formatter 280 via a bus 281. A servo interface may be electrically disposed between the servo logic and disk formatter 280. Disk formatter 280 is also coupled to the first storage device via a bus 289. A read/write interface may be electrically coupled between disk formatter 280 and the first storage device. Finally, disk formatter 280 is coupled to main bus 230 via a bus 287 and is coupled to ECC engine 260 via a bus 283.

The operation of the present invention will now be explained with first reference to FIG. 1. An initiator device coupled to bus 135 requests a masked data transfer with the first storage device. For example, a SCSI device can request such a masked transfer due to an available SCSI command that allows masked transfers. The initiator device transmits mask information 140 over bus 135 to data controller 100. The transfer mask information is initialized by the SCSI device.

Microcontroller 110 programs buffer manager 250 (FIG. 2) to store mask information 140 into second storage device 120. Since second storage device 120 lacks data protection, such as parity, microcontroller 110 duplicates mask information 140 in second storage device 120. The duplicate data will be used to check the integrity of the mask information. As illustrated in FIG. 1, a word of mask information 140 is stored at a first memory address of storage device 120. Microcontroller 110 reads each mask word 150 from second storage device 120 and generates a duplicate 160 of that word. The duplicate of that word is stored in the immediately following address of second storage device 120. A mask entry of second storage device 120 includes a word of mask information 140 and the corresponding duplicate word. Mask information 140 is stored in second storage device 120 as a transfer mask table. Second storage device 120 preferably stores the mask information 140 with the duplicated mask information in an interleaved manner. The interleaved storage allows for simpler function implementation as discussed below.

Microcontroller 110 then writes or programs a mask index counter (282 in FIG. 2) with the entry address of second storage device 120 that corresponds to the first mask word and its corresponding duplicate word. A value in the mask index counter is appended to a mask base address register value to form a complete address for second storage device 120. The mask index counter preferably is designed to handle up to 512 entries. This written address initiates the data formatter 280 to request buffer manager 250 to transfer a mask word and the corresponding duplicate. Preferably, buffer manager 250 provides the mask word and its corresponding duplicate word responsive to the entry address stored in the mask index counter. The mask word of this pair is saved in a mask word register (284 in FIG. 2) and the corresponding duplicate is stored in a duplicate register (286 in FIG. 2).

A mask bit counter (288 in FIG. 2) preferably is also initialized to zero by microcontroller 110. The mask bit counter sets which bit of the mask word to first evaluate, then is incremented to set the following bits of the word that are to be subsequently evaluated. As such, the bit counter provides a mask word index value. After the first entry is acquired, the mask bit counter starts the next mask word preferably at bit zero.

Each bit of the mask information 140 is associated to a specific logical sector (or other data unit) address of the first storage device, where defective sectors are taken into account. Before a sector transfer is processed, the present bit in the mask word register and its corresponding duplicate in the duplicate register are compared. If they are not equal, an error signal is generated by data formatter 280. If a defective sector is encountered the current mask bit is held (not processed) until the next logical sector address. A 1 bit preferably represents that the information stored at the associated logical sector address is not masked, i.e., transferred. A 0 bit represents that the information is masked, i.e., skipped.

As stated above, storing the mask word and its duplicate in an interleaved manner provides for simpler functional implementation of the comparing function. In particular, buffer manager 250 (FIG. 2) fetches two words (mask and duplicate) from second storage device 120 in response to each entry address stored in the mask index counter. If the mask and duplicate words were not interleaved, as second fetch would be required. Thus, the present invention minimizes time in fetching the words from second storage device 120.

After an entire word of sectors is transferred, the next word (if necessary) is fetched from second storage device 120. This fetch is started in response to the bit mask counter resetting to zero. The next word is fetched and loaded into the mask bit and mask index counters while the last sector of the word is transferred. As a result, the present invention in effect pipelines the mask word fetches to provide continuous data transfer. This allows quicker data transfer since the microcontroller does not have to reprogram those counters at the end of each stored mask word. Furthermore, the counters can maintain their respective values due to the pipeline feature so that if the sectors to be transferred are not continuous with other sectors (i.e., data) on another track that also have to be transferred, the counters do not have to be reprogrammed at the completion of a track seek. This feature also allows quicker data transfer my eliminating microcontroller interaction.

The present invention provides programmable mask index and mask bit counters. The benefit of the programmability is evident when viewed with the issue of transfer problems. For example, if the data transfer is erroneously tracked by the servo, the counters of the present invention can be reprogrammed with the values of the entry address and the bit value that correspond to the next sector to be transferred after the previously good sector transferred. In particular, it is preferred that once the erroneous tracking is detected, microcontroller 110 determines from information stored in disk formatter 280 how many good sectors were transferred. From this information, the microcontroller can calculate the address and bit position for the sector to transferred next. The microcontroller then programs the mask bit and mask index counters with the associated address and bit information.

The present invention also has the capability to not transfer the last requested sector if that sector is masked. This capability eliminates the need to parse the mask table to determine how a data formatter should be programmed. To illustrate, a SCSI command may request 120 sectors, but that last sector is masked. It is possible to eliminate transferring such a sector by first parsing the mask information to determine if the last sector is masked. This would require extra time to transfer, which is not desirable.

Figure 3:
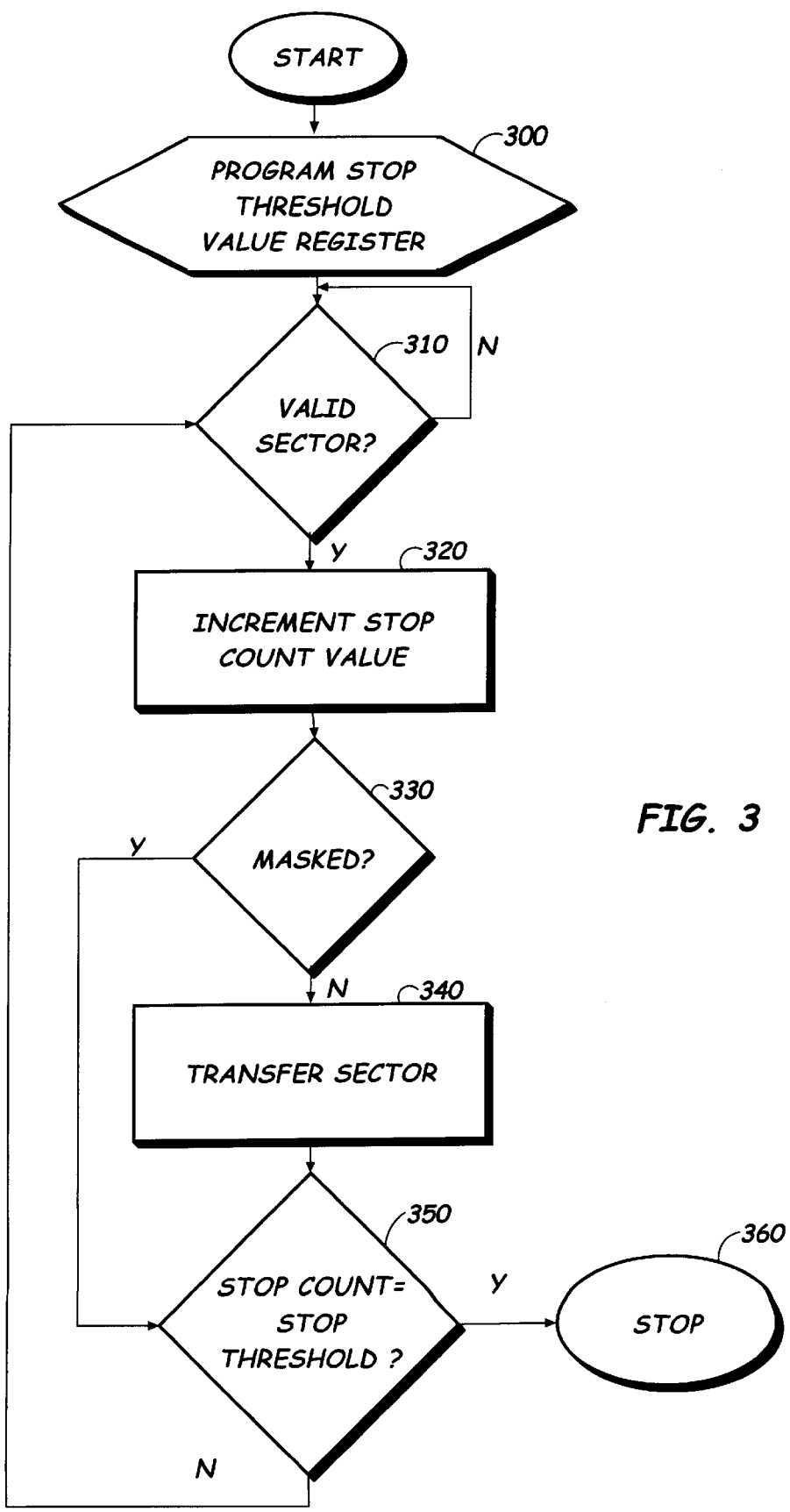
FIG. 3 is a flow chart of one function of the present invention.

To overcome this extra time problem, the present invention evaluates whether a stop count value equals a stop threshold value when a sector is identified as being masked. Referring to FIG. 3, at 300 stop threshold value register in disk formatter 280 is programmed with a stop threshold value. The stop threshold value is the total number of sectors to be transferred. At 310, the sector is determined whether valid (e.g., not detective). If the sector is valid, the stop count value is incremented at 320 for each sector that is read from the first storage device, regardless of whether that sector is to be transferred or masked. Defective sectors, are not, included in the mask counter and do not increment the stop count. At 310, if the sector is not masked, it is transferred at 340. Otherwise, the flow skips to 350. At 350, the stop count value equals the stop threshold value the a stop flag generated to a sequencer in data formatter 280 to stop the transfer and the flow stops at 360.

The present invention automates a mask data transfer. As a result, firmware interaction is minimized along with the additional firmware needed to provide this automation. For example, the present invention eliminates the need to parse the mask table to determine which data should be transferred. This eliminated parsing is important since parsing with a byte-based microcontroller or microprocessor is difficult and time consuming. In addition, the present invention advantageously provides for minimal interaction with the flow of a data formatter. In other words, the data formatter will have to perform a minimal number of steps in its flow that are specific to transfer masked data. In this manner, firmware complexity is reduced along with the data transfer time of the data formatter.

The present invention functions independent of the existence of defective sectors. As a result, the present invention does not require additional overhead (e.g., firmware or hardware) to accommodate them. Further details regarding an implementation for handling defective sectors are in U.S. patent application Ser. No. 08/722,729, entitled "HEADERLESS FORMATTED DISK DRIVE," which is incorporated herein by reference.

Figures 4A, 4B:
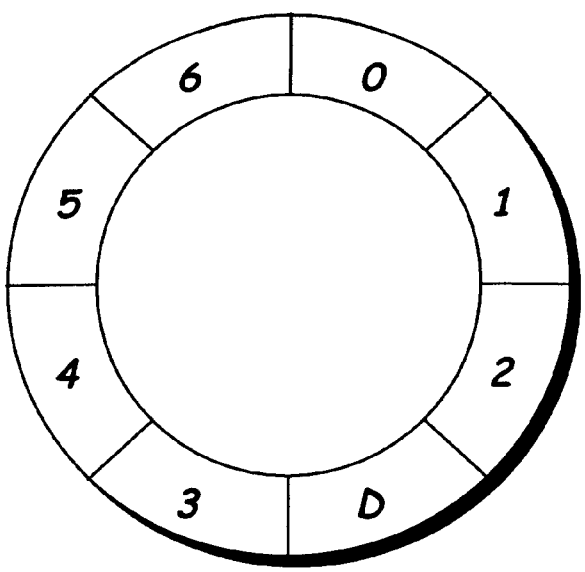
FIGS. 4A and 4B illustrate operation of the present invention.

A specific operating example of the present invention will be explained with reference to FIGS. 4A and 4B. FIG. 4A depicts a track of a storage medium that has eight physical sectors. One of the physical sectors is defective (referenced as D), thus there are seven logical sectors as shown.

A mask command for such a track can be as shown in FIG. 4B. This command is stored in the mask word register 284 In that figure, there are seven bits (although the mask command may have more or less bits) for a data transfer. As shown in FIG. 4B, the first four logical sectors are desired for transfer, the fifth sector is masked and the remaining two sectors are also desired for transfer. Note that the mask command does not take into consideration the defective sector D shown in FIG. 4A.

Mask bit counter (288 in FIG. 2) is initally programmed to index the first bit of the mask command stored in mask word register 284. After the sector that corresponds to that first bit is transferred, the mask bit counter is incremented so that the next bit of the mask command is processed. These steps are continued until the entire mask command is processed. Although the present invention can be used to transfer data generally, it is particularly advantageous for data transfers where data units are not stored contiguously, e.g. when two types of data units are stored intermixedly.

Numerous variations and modifications of the embodiment described above may be effected without departing from the spirit and scope of the novel features of the invention. To illustrate, the duplication of the mask table can be entirely performed by hardware. The partitioning of the mask information can have other lengths besides a word. The bits of the mask information can correspond to any unit of data besides sectors. The counters or registers of the present invention can be any storage device. Moreover, a skilled artisan will recognize that the present invention can be used for either a data read from or write to a storage device.

It is to be understood that no limitations with respect to the specific device illustrated herein are intended or should be inferred. It is, of course, intended to cover by the appended claims all such modifications as fall within the scope of the claims.

We claim:

1. A method of transferring certain data intermixed with other data comprising the steps of:
   storing a mask table;
   storing a duplicate mask table;
   comparing the mask word to a duplicate mask word from the duplicate table;
   maintaining a first index value;
   maintaining a second index value;
   retrieving a mask word from the mask table responsive to the first index value; and
   transferring the certain data responsive to the mask word and the second index value, wherein a last data unit is not transferred if a stop count value compared with a stop threshold value is determined to be equal and the last data unit is masked.

2. The method of claim 1 wherein the first index value is maintained in a counter.

3. The method of claim 1 wherein the second index value is maintained in a counter.

4. A method of transferring data comprising the steps of:
   reading an item of mask information from a memory address;
   duplicating the mask information into a first item of mask information and a second item of mask information;
   storing the first item of mask information and the second item of mask information wherein the first item of mask information and the second item of mask information are suitable for being compared to identify an error contained in at least one of the first item of mask information and the second item of mask information; and evaluating whether a stop count value equals a stop threshold value when a sector is identified as masked so as to terminate a transfer when the stop threshold value is equal to the stop count value, wherein the stop threshold value equals the total number of items to be transferred, the stop count value is incremented for each sector that is read.

5. The method as described in claim 4, wherein an error is identified, generating an error message, and wherein if an error is not identified, the item of mask information is transferred.

6. The method as described in claim 4, wherein the item of mask information is read from a first storage device and at least one of the first item of mask information and the second item of mask information are stored on a second storage device.

7. The method as described in claim 4, wherein the first item of mask information and the second item of mask information are stored in an interleaved manner.

8. The method as described in claim 4, wherein the read item of mask information includes at least one of a bit, a portion of a word of mask information, a word of mask information and a plurality of words of mask information.

9. The method as described in claim 4, wherein a mask bit counter is utilized to initiate a fetch of a third item of mask information, so that the third item of mask information may be loaded into the mask bit counter and a mask index counter.

10. The method as described in claim 9, wherein the third item of mask information is fetched as a last portion of the item of mask information is transferred so as to enable a continuous data transfer.

11. The method as described in claim 9, wherein the transfer may be achieved without microcontroller intervention and wherein the microcontroller does not have to reprogram at least one of the mask bit and mask index counter.

12. The method as described in claim 4, wherein at least one of a mask index and mask bit counter is programmable.

13. The method as described in claim 4, wherein a defective sector is detected the stop count value is not incremented.

14. A data transfer system, comprising:
a first storage device;
a data controller coupled to the first storage device;
an initiator device coupled to the data controller;
a microcontroller coupled to the data controller; and
a second storage device coupled to the data controller;
wherein the initiator device request a masked data transfer with the first storage device, the microcontroller programs the data controller to store mask information into the second storage device, and the microcontroller duplicates mask information in second storage device so as to enable integrity of the mask information to be determined.

15. The data transfer system of claim 14, wherein the duplicate of the mask information is stored in an interleaved manner.

16. The data transfer system of claim 14, wherein mask information is stored in the second storage device as a transfer mask table.

17. The data transfer system of claim 14, further comprising a mask index counter.

18. The data transfer system of claim 17, wherein the mask index counter is suitable for being programmed with an entry address of the second storage device that corresponds to the first mask word and its corresponding duplicate word.

19. The data transfer system of claim 17, where a value in the mask counter is appended to a mask base address register value to form a complete address for second storage device.

20. The data transfer system of claim 17, wherein the mask index counter is capable of handling up to 512 entries.

21. The data transfer system of claim 17, wherein the mask index counter enables the data controller to provide the mask information and its corresponding duplicate mask information responsive to an entry address stored in the mask index counter.

22. The data transfer system of claim 17, wherein the mask information is saved in a mask word register and the corresponding duplicate is stored in a duplicate register.

23. The data transfer system of claim 22, wherein the mask word register and the duplicate register are compared, and if the values are not equal, an error signal is generated.

24. The data transfer system of claim 14, further comprising a mask bit counter, wherein the mask bit counter sets which bit of the mask information to first evaluate, then increments to set a following bit of the mask information to be subsequently evaluated, so as to provide a mask word index value.

25. The data transfer system of claim 24, wherein a second mask information is fetched from the second storage device in response to the bit mask counter resetting to zero.

26. The data transfer system of claim 25, wherein the second mask information is fetched and loaded into the mask bit and mask index counters while a last portion of the first mask information is transferred.

27. The data transfer system of claim 14, wherein at least one of a mask bit counter and mask index counter are programmable.

28. The data transfer system of claim 14, further comprising evaluating whether a stop count value equals a stop threshold value when a sector is identified as being masked.

29. The data transfer system of claim 28, wherein the stop count value is incremented for each sector that is read from the first storage device and the stop threshold value is equal to the total number of sectors to be transferred.

30. The data transfer system of claim 14, wherein the mask information includes at least one of a bit, a mask word and a plurality of mask words.

31. A method for transferring masked data, comprising:
requesting a masked data transfer;
programming a mask index counter with an address corresponding to a first mask word and a corresponding duplicated second mask word;
initializing a mask bit counter, the mask bit counter suitable for setting which bit of the first mask word to evaluate and also suitable for being incremented to set an additional bit for subsequent evaluation;
evaluating the first mask word, wherein a present bit indicated by the mask bit counter is compared with a corresponding second bit in a second mask word; and when the present bit is not equal to the corresponding second bit in the second mask word, generating an error signal; and when a bit subsequent to the present bit is available for evaluation as a part of the first mask word, not processing the subsequent bit included in the first mask word; and
transferring at least one of the first mask word and the corresponding second mask word, in which at least one of the first mask word and the corresponding second mask word is transferred if the first mask word and the corresponding second mask word are equal.

32. The method as described in claim 31, wherein requesting a masked data transfer includes requesting a masked data transfer with a first storage device and programming includes programming the mask index counter with the address of a second storage device corresponding to the first mask word and the corresponding duplicate word.

33. The method of claim 31, wherein after the first mask word is acquired, the mask bit counter starts a second mask word.

* * * * *